United States Patent
Gershman et al.

(10) Patent No.: US 6,705,522 B2
(45) Date of Patent: Mar. 16, 2004

(54) MOBILE OBJECT TRACKER

(75) Inventors: Anatole V. Gershman, Chicago, IL (US); Dadong Wan, Palatine, IL (US)

(73) Assignee: Accenture Global Services, GmbH (CH)

(*) Notice: Subject to any disclaimer, the term of this patent is extended or adjusted under 35 U.S.C. 154(b) by 1 day.

(21) Appl. No.: 09/970,438

(22) Filed: Oct. 3, 2001

(65) Prior Publication Data

US 2003/0071118 A1 Apr. 17, 2003

(51) Int. Cl.[7] .............................................. G06F 17/60
(52) U.S. Cl. ........................ 235/385; 235/449; 235/384
(58) Field of Search ............................... 235/385, 384, 235/375, 462.01, 381, 379

(56) References Cited

U.S. PATENT DOCUMENTS

| | | |
|---|---|---|
| 4,673,932 A | 6/1987 | Ekchian et al. |
| 5,798,693 A * | 8/1998 | Engellenner ............. 340/10.33 |
| 6,025,725 A * | 2/2000 | Gershenfeld et al. ........ 324/652 |
| 6,195,006 B1 | 2/2001 | Bowers et al. |
| 6,294,999 B1 * | 9/2001 | Yarin et al. ............... 340/573.1 |
| 6,380,858 B1 * | 4/2002 | Yarin et al. ............... 340/573.1 |
| 6,388,569 B1 * | 5/2002 | Engellenner ................ 340/505 |
| 6,472,987 B1 * | 10/2002 | Gershenfeld et al. .... 340/572.4 |
| 6,556,148 B2 * | 4/2003 | Ellis ........................... 340/990 |
| 6,600,418 B2 * | 7/2003 | Francis et al. ........... 340/572.1 |
| 6,617,962 B1 * | 9/2003 | Horwitz et al. ............ 340/10.4 |

FOREIGN PATENT DOCUMENTS

| | | |
|---|---|---|
| EP | 1 017 005 A2 | 7/2000 |
| EP | 1 017 005 A3 | 7/2002 |
| GB | 2 288 299 A | 3/1994 |
| WO | WO 02/01467 A2 | 1/2002 |

OTHER PUBLICATIONS

International Search Report.

* cited by examiner

*Primary Examiner*—Thien M. Le
(74) *Attorney, Agent, or Firm*—Banner & Witcoff, Ltd.

(57) ABSTRACT

Methods and systems for identifying locations of objects are provided. A first location of a mobile transceiver unit is determined and a first plurality of objects each having a tag attached to the object are illuminated with electromagnetic radiation. The mobile transceiver unit then simultaneously senses electromagnetic radiation emitted by the tags attached to the first plurality of objects. The identities of the first plurality of objects are determined from the sensed electromagnetic radiation.

22 Claims, 4 Drawing Sheets

MOBILE OBJECT TRACKER

BACKGROUND OF THE INVENTION

1. Field of the Invention

The present invention relates generally to inventory tracking. More particularly, the present invention provides systems and methods for identifying the location of objects with a movable reading device.

2. Description of Related Art

Typical inventory control systems employ fixed readers and tags attached to objects that are to tracked. The tags are scanned as the objects enter a warehouse or other building and are placed in a storage location. Information identifying the objects and the locations of the objects may be stored in a computer database. It is not uncommon for objects to be moved, for example within a warehouse, after they are first stored in the location identified in the database. If the location information of the objects that have been moved is not updated, there will not be an accurate record of the location of the objects.

One proposed solution involves using humans to continuously conduct inventory tracking. In addition to being prohibitively expensive and time-consuming, in some environments it can be dangerous or not feasible to have humans conduct inventory tracking.

Therefore, there exists a need in the art for a system that continuously and accurately performs inventory tracking. There also exists a need in the art for a system that performs inventory tracking in environments that are not suitable for humans.

BRIEF SUMMARY OF THE INVENTION

The present invention provides systems and methods that can be used to perform inventory tracking. Among other advantages, the disclosed systems and methods facilitate efficient and continuous inventory tracking.

In a first embodiment, a method of identifying locations of objects is provided, the method includes the steps of determining a first location of a mobile transceiver unit and illuminating with electromagnetic radiation a first plurality of objects each having a tag attached to the object. Electromagnetic radiation emitted by the tags attached to the first plurality of objects is then simultaneously sensed and used to identify the first plurality of objects.

In another embodiment of the invention, computer-executable instructions for performing one or more of the disclosed methods is stored on a computer-readable medium, such as a floppy disk or CD-ROM.

An object location identification system is also provided. The system includes a plurality of object tags attached to objects and at least one location tag. A mobile transceiver unit is configured to perform the steps of: (a) illuminating with electromagnetic radiation the plurality of object tags and the at least one location tag; (b) simultaneously sensing electromagnetic radiation emitted by the object tags and the at least one location tag; and (c) utilizing the reflected electromagnetic radiation to identify the first plurality of objects.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 1:
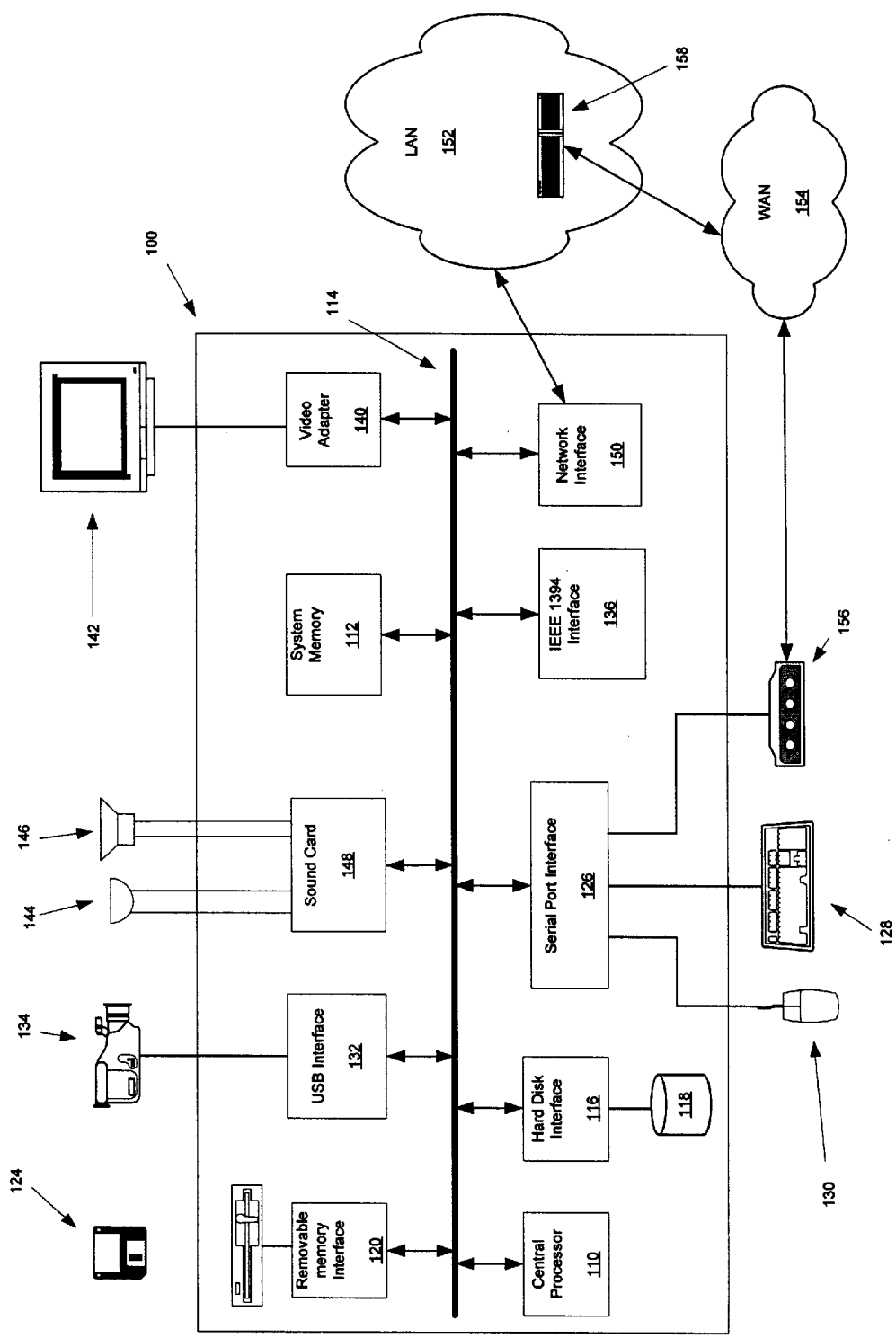
FIG. 1 shows a typical prior art workstation and communication connections.

Elements of the present invention may be embodied on a computer system, such as the system 100 shown in FIG. 1. Computer 100 includes a central processor 110, a system memory 112 and a system bus 114 that couples various system components including the system memory 112 to the central processor unit 110. System bus 114 may be any of several types of bus structures including a memory bus or memory controller, a peripheral bus, and a local bus using any of a variety of bus architectures. The structure of system memory 112 is well known to those skilled in the art and may include a basic input/output system (BIOS) stored in a read only memory (ROM) and one or more program modules such as operating systems, application programs and program data stored in random access memory (RAM).

Computer 100 may also include a variety of interface units and drives for reading and writing data. In particular, computer 100 includes a hard disk interface 116 and a removable memory interface 120 respectively coupling a hard disk drive 118 and a removable memory drive 122 to system bus 114. Examples of removable memory drives include magnetic disk drives and optical disk drives. The drives and their associated computer-readable media, such as a floppy disk 124 provide nonvolatile storage of computer readable instructions, data structures, program modules and other data for computer 100. A single hard disk drive 118 and a single removable memory drive 122 are shown for illustration purposes only and with the understanding that computer 100 may include several of such drives. Furthermore, computer 100 may include drives for interfacing with other types of computer readable media.

A user can interact with computer 100 with a variety of input devices. FIG. 1 shows a serial port interface 126 coupling a keyboard 128 and a pointing device 130 to system bus 114. Pointing device 130 may be implemented with a mouse, track ball, pen device, or similar device. Of course one or more other input devices (not shown) such as a joystick, game pad, satellite dish, scanner, touch sensitive screen or the like may be connected to computer 100.

Computer 100 may include additional interfaces for connecting devices to system bus 114. FIG. 1 shows a universal serial bus (USB) interface 132 coupling a video or digital camera 134 to system bus 114. An IEEE 1394 interface 136 may be used to couple additional devices to computer 100. Furthermore, interface 136 may configured to operate with particular manufacture interfaces such as FireWire developed by Apple Computer and i.Link developed by Sony. Input devices may also be coupled to system bus 114 through a parallel port, a game port, a PCI board or any other interface used to couple and input device to a computer.

Computer 100 also includes a video adapter 140 coupling a display device 142 to system bus 114. Display device 142 may include a cathode ray tube (CRT), liquid crystal display (LCD), field emission display (FED), plasma display or any other device that produces an image that is viewable by the user. Additional output devices, such as a printing device (not shown), may be connected to computer 100.

Sound can be recorded and reproduced with a microphone 144 and a speaker 166. A sound card 148 may be used to couple microphone 144 and speaker 146 to system bus 114. One skilled in the art will appreciate that the device connections shown in FIG. 1 are for illustration purposes only and that several of the peripheral devices could be coupled to system bus 114 via alternative interfaces. For example, video camera 134 could be connected to IEEE 1394 interface 136 and pointing device 130 could be connected to USB interface 132.

Computer 100 can operate in a networked environment using logical connections to one or more remote computers or other devices, such as a server, a router, a network personal computer, a peer device or other common network node, a wireless telephone or wireless personal digital assistant. Computer 100 includes a network interface 150 that couples system bus 114 to a local area network (LAN) 152. Networking environments are commonplace in offices, enterprise-wide computer networks and home computer systems.

A wide area network (WAN) 154, such as the Internet, can also be accessed by computer 100. FIG. 1 shows a modem unit 156 connected to serial port interface 126 and to WAN 154. Modem unit 156 may be located within or external to computer 100 and may be any type of conventional modem such as a cable modem or a satellite modem. LAN 152 may also be used to connect to WAN 154. FIG. 1 shows a router 158 that may connect LAN 152 to WAN 154 in a conventional manner.

It will be appreciated that the network connections shown are exemplary and other ways of establishing a communications link between the computers can be used. The existence of any of various well-known protocols, such as TCP/IP, Frame Relay, Ethernet, FTP, HTTP and the like, is presumed, and computer 100 can be operated in a client-server configuration to permit a user to retrieve web pages from a web-based server. Furthermore, any of various conventional web browsers can be used to display and manipulate data on web pages.

The operation of computer 100 can be controlled by a variety of different program modules. Examples of program modules are routines, programs, objects, components, data structures, etc., that perform particular tasks or implement particular abstract data types. The present invention may also be practiced with other computer system configurations, including hand-held devices, multiprocessor systems, microprocessor-based or programmable consumer electronics, network PCS, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

Figure 2:
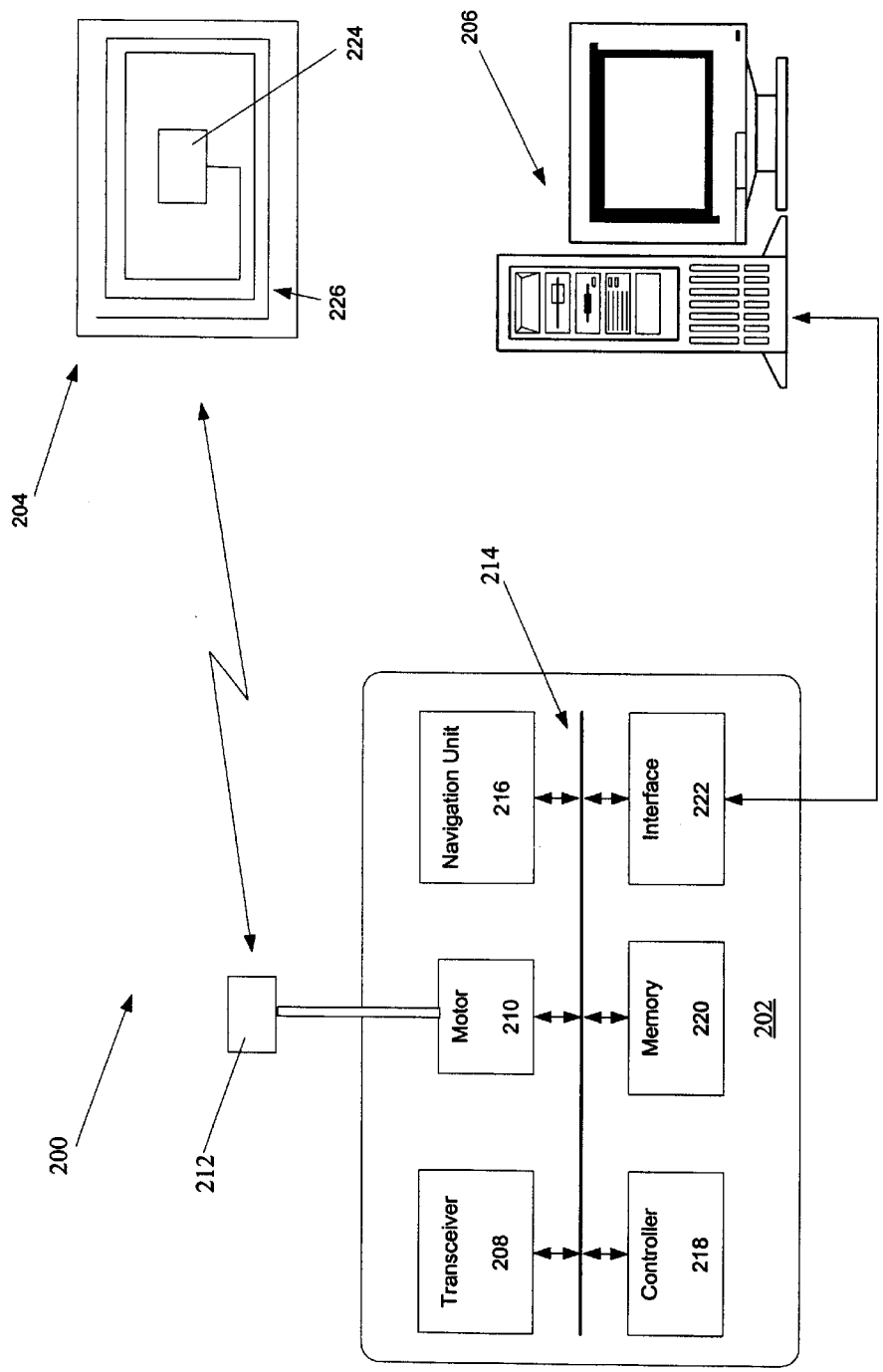
FIG. 2 illustrates an object location identification system in accordance with an embodiment of the invention.

FIG. 2 illustrates an object location identification system 200 in accordance with an embodiment of the invention. A mobile transceiver unit 202 may send and receive information to a tag 204 and a computer 206. The mobile transceiver unit 202 may include a transceiver module 208 that may generate and decode electromagnetic radiation, such as radio frequency radiation. A motor 210 may be included to control the direction of an antenna 212. The components that makeup mobile transceiver unit 202 may be electrically connected to one another through an electrical bus 214. Some of the embodiments in the present invention may utilize a navigation unit 216 to determine the location of mobile transceiver unit 202. A controller 218 may be included to control the overall operation of mobile transceiver unit 202. A memory 220 may be included to store and operating program, location data, tag data or any other information that may be required. An interface 222 may be included to couple mobile transceiver unit 202 to computer 206 or to other mobile transceiver units. Interface 222 may be a wireless interface, one of interfaces illustrated in FIG. 1 or any other interface he can be used to electrically connect mobile transceiver unit 202 to computer 206 or to another mobile transceiver unit.

Tag 204 may be implemented with a radio frequency identification (RFID) tag. The structure and operation of RFID tags are well-known to those skilled in the art. A semiconductor chip 224 may store information such as the identification of an object, properties of the object or any other information. An antenna 226 may wrap around semiconductor chip 224 and absorb electromagnetic radiation emitted by antenna 212. The received electromagnetic radiation energy may be used to provide power to semiconductor chip 224. In particular, the energy may be used to read information stored in chip 224 and transmit electromagnetic radiation from tag 204 to antenna 212. Of course, a variety of other tags may be used with the present invention. For example, the present invention may be used with active RFID tags. Active RFID tags contain a power source, such as a battery, that can be used to provide power to chip 224 and antenna 226. One of the advantages of active RFID tags is that they generally have a longer range than passive RFID tags, such as tag 204 shown in FIG. 2.

Figure 3:
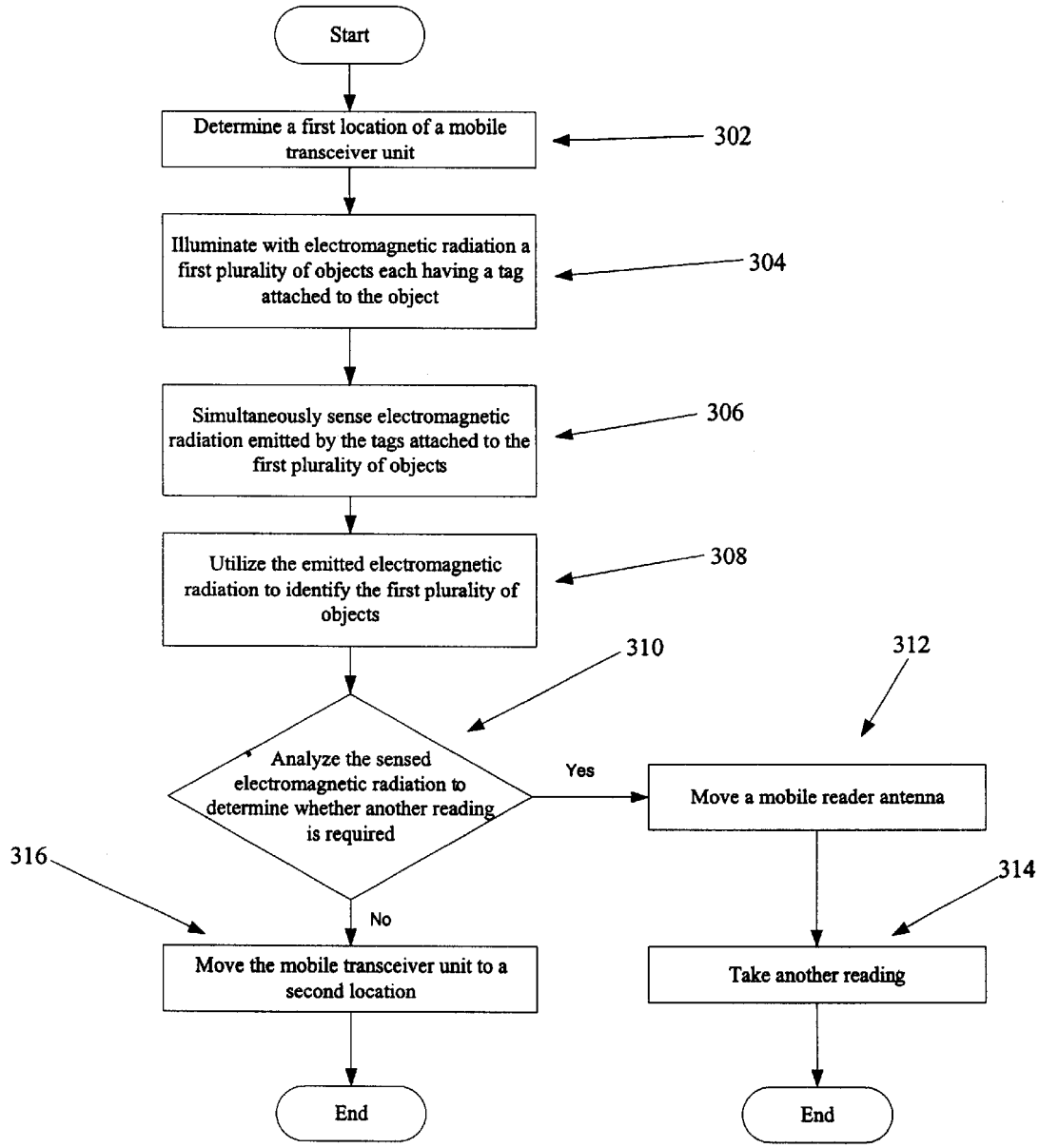
FIG. 3 is a flow chart that illustrates a method of identifying the location of objects in accordance with an embodiment of the invention.
Figure 4:
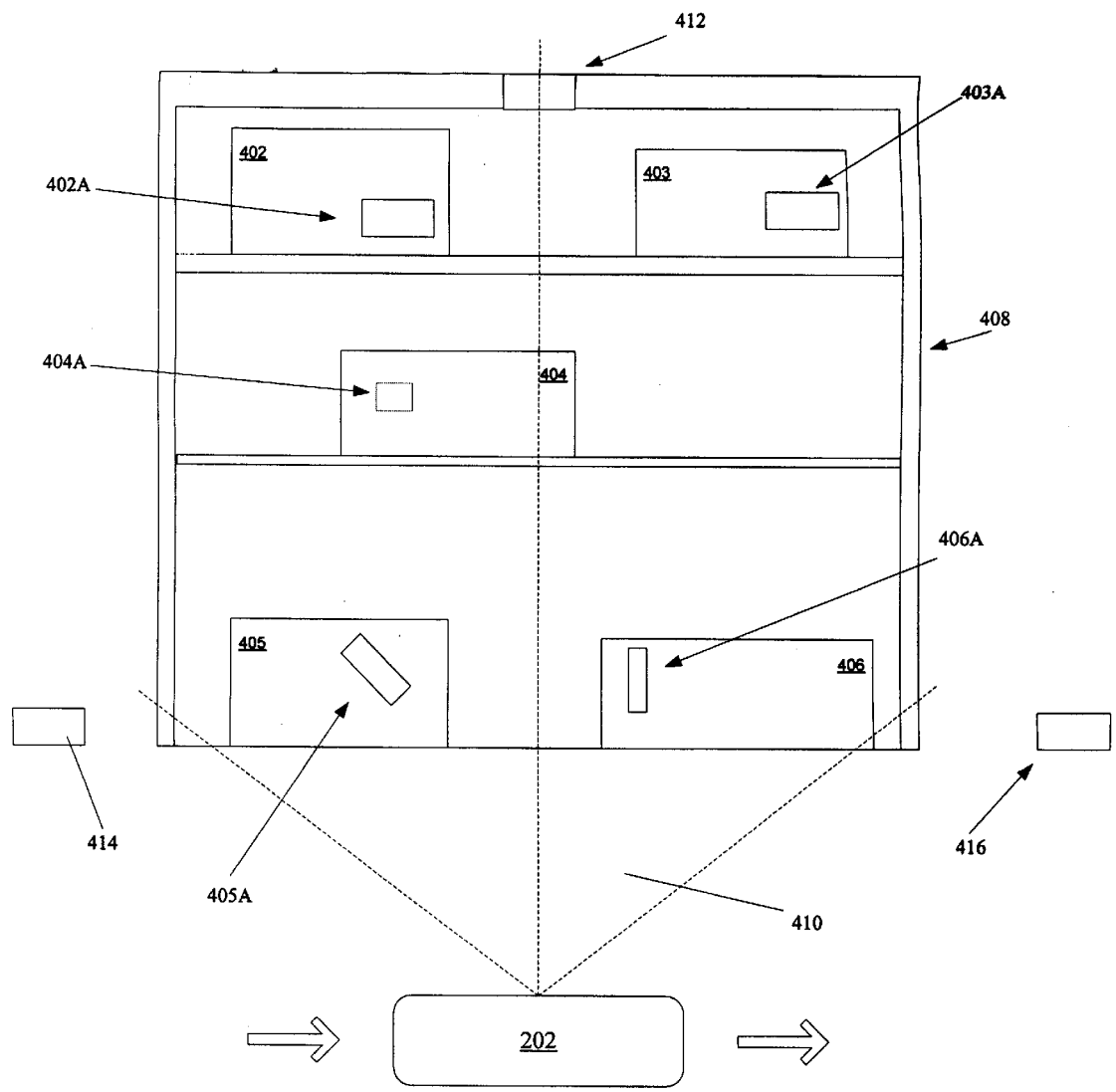
FIG. 4 illustrates an object location identification system that utilizes a mobile transceiver unit traveling along the floor of a warehouse in accordance with an embodiment of the invention.

FIG. 3 illustrates a method of identifying the location of objects in accordance with an embodiment of the invention. First, in step 302, a first location of the mobile transceiver unit is determined. Navigation unit 216, shown in FIG. 2, may be used to determine the location of mobile transceiver unit 202. FIG. 4 illustrates an alternative embodiment in which location RFID tags may be used to determine location information. FIG. 4 shows a group of boxes 402–406 arranged in a storage bin 408. Mobile transceiver unit 202 emits and senses electromagnetic radiation within a cone 410. Location RFID tag 412 may contain information identifying the location of storage bin 408. When reading information stored on RFID object tags 402A–406A, mobile transceiver unit 202 may also read information stored on location RFID tag 412.

Alternatively, location RFID tags may be placed within the field of travel of mobile transceiver unit 202. For example, location RFID tag 414 may be placed at a known distance before storage than 408. Mobile transceiver unit 202 may pass RFID location tag 414 and read location information and a traveling distance to the center of storage bin 408 before reading the object RFID tags. In yet another embodiment, mobile transceiver unit 200 to may read RFID location tag 416 which is placed after storage bin 408 and contains information identifying the location of the next storage than. For example, location RFID tag 416 may instruct mobile transceiver unit 202 to travel 100 feet to the north and than 30 feet to the east to the next storage bin.

Of course, computer 206 (shown in FIG. 2) may be used to control the movement of mobile transceiver unit 202 and identify location information. For example, after reading location RFID tag 412, mobile transceiver unit may transmit object location information to computer 206. Computer 206 may then determine the location of the next storage bin, which may be stored in a memory within computer 206 and then instruct mobile transceiver unit how to advance to the next storage bin.

In step 304, a first plurality of objects each having a tag attached to the object are illuminated with electromagnetic radiation. FIG. 4 shows mobile transceiver unit 202 illuminating all of the objects and tags within cone 410. One of the advantages of using RFID tags is that they do not require a direct line of sight between the reader and attack. Tag 404A is located on the side of the box opposite mobile transceiver unit 202. Radio frequency radiation penetrates the box and allows mobile transceiver unit 202 to read information stored on tag 404A. RFID tags also do not have to have a fixed orientation with respect to mobile transceiver unit 202 and can contain a variety of information in addition to location information.

Next, in step 306, mobile transceiver unit 202 simultaneously senses electromagnetic radiation emitted by the tags attached to the first plurality of objects. Tags 402A–406A may simultaneously emit radiation that identifies the objects. Conventional RFID readers simultaneously sense and decode radiation emitted by a plurality of RF ID tags. One example of a suitable reader is sold under the brand-name TagIt by Texas Instruments.

In step 308, the emitted electromagnetic radiation is used to identify the first plurality of objects. Semiconductor chip 224 shown in FIG. 2 may store information that identifies the objects, such as a part number, nomenclature, serial number, SKU number or any other information they can be used to identify the object.

There may be occasions in which mobile transceiver unit 202 does not take accurate readings. For example, an object or person may be positioned within cone 410 and prevent an accurate reading from taking place. Mobile transceiver unit 202 or computer 206 may include software that identifies a faulty reading. One skilled in the art will appreciate that their number of different conditions that can be associated with a faulty reading and can be used to improve the integrity of the system. Memory 220 may include information regarding the maximum capacity of storage bin 408 and the expected number of objects stored in storage bin 408. After reading the information stored on object RFID tags for 402A–406A, the information may be compared to the maximum capacity of storage bin 408 and the expected number of objects stored in storage bin 408. If it appears that the number of objects stored in storage bin 408 exceeds the storage capacity of storage bin 408 the reading may be identified as faulty. Similarly, if the number of objects stored in storage than 408 does not correspond to the number expected to be in storage bin 408, the reading may be identified as faulty. Of course, there are numerous other alternative or additional conditions and may be used to identify faulty readings.

In an alternative embodiment (not shown), a series of RFID tags may be placed within cone 410 to ensure that nothing is obstructing mobile transceiver unit 202. If mobile transceiver unit 202 does not receive a reading from one or more of the RFID tags that are known to exist, it may be determined that something is placed between the mobile transceiver unit and the RFID tags.

After a faulty reading has been identified, mobile transceiver unit 202 may again illuminate the objects with electromagnetic radiation and sense the electromagnetic radiation emitted by the tags to take another reading. Alternatively, in step 312 the antenna of the mobile transceiver unit antenna 212 may be moved or adjusted. In step 314, mobile transceiver unit 202 may take another reading. Steps 310, 312 and 314 may be repeated several times in an attempt to obtain an accurate reading. In one embodiment of the invention, if a reading is identified as faulty because the number of objects identified does not correspond to the expected number of objects, mobile transceiver unit 202 may take one additional reading, identify the reading as possibly faulty for later use by an operator, or take consecutive readings until two consecutive readings correspond.

After it is determined that a reading is not indicated as faulty, mobile transceiver unit 202 may then be moved to a second location in step 316. The entire process may then be repeated over and over again at different locations. Of course, mobile transceiver unit 202 may also be moved after a reading is determined to be faulty.

Faulty readings may also be identified with software installed on computer 206. A single mobile transceiver unit 202 may routinely take two or more successive readings with antenna 212 in different positions. Computer 206 may then analyze the readings and determine if one or more readings are faulty. Similarly, two or more mobile transceiver units having antennas 212 in different orientations may travel along the same path and take redundant readings. Computer 206 may compare the readings and identify faulty readings. Furthermore, when two or more mobile transceiver units 202 are being utilized, the mobile transceiver units may include interface units for communicating with one another. Software for identifying faulty readings may be installed on one or more of the mobile transceiver units.

FIG. 4 shows an embodiment in which mobile transceiver unit 202 travels along the floor of a warehouse. Mobile transceiver unit 202 may include a motor and wheels or other mechanisms for moving the mobile transceiver unit. Mobile transceiver unit 202 may be implemented with a robotic device programmed to travel a predetermined path. Location RFID tags may be used to update location information stored in the robotic device. In another embodiment, mobile transceiver unit 202 may be attached to tract along the ceiling of a building our storage facility. Elements of mobile transceiver unit 202 may also be attached to a vehicle that regularly travels through a building, storage facility, work site or other area that is used to store objects.

Unlike conventional methods used to identify location of objects, the present invention does not require a user to be present at the location where the information is obtained. As a result, the present invention may be utilized in environments that are not suitable or safe for humans.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, the invention may be used to track a person or vehicle by attaching a reading device to the person or vehicle and recording information read from location tags as the person or vehicle moves.

We claim:

1. A method of identifying locations of objects, the method comprising the steps of:

(a) determining a first location of a mobile transceiver unit;

(b) illuminating with electromagnetic radiation a first plurality of objects each having a tag attached to the object;

(c) simultaneously sensing electromagnetic radiation emitted by the tags attached to the first plurality of objects; and (d) utilizing the emitted electromagnetic radiation to identify the first plurality of objects.

2. The method of claim 1, further including the step of analyzing the sensed electromagnetic radiation to determine whether steps (b) and (c) should be repeated.

3. The method of 2, further including the steps of:

moving an antenna attached to the mobile transceiver unit; and repeating steps (b) and (c).

4. The method of claim 1, wherein step (a) comprises:

illuminating with electromagnetic radiation at least one location tag;

sensing electromagnetic radiation emitted by the at least one location tag; and utilizing the electromagnetic radiation emitted by the at least one location tag to determine the first location.

5. The method of claim 4, wherein step (b) and the step of illuminating at least one location tag are performed simultaneously.

6. The method of claim 1, wherein step (a) comprises recording an output of an inertial navigation unit aboard the mobile transceiver unit.

7. The method of claim 1, wherein step (a) comprises:

illuminating with electromagnetic radiation at least one location tag;

sensing electromagnetic radiation emitted by the at least one location tag;

utilizing the electromagnetic radiation emitted by the at least one location tag to determine the first location and a distance to the first location; and advancing the mobile transceiver unit to the first location.

8. The method of claim 1, further including the steps of:

(e) moving the mobile transceiver unit to a second location;

(f) determining the second location;

(g) illuminating with electromagnetic radiation a second plurality of objects each having a tag attached to the object;

(h) simultaneously sensing electromagnetic radiation emitted by the tags attached to the second plurality of objects; and (i) utilizing the electromagnetic radiation emitted in step (h) to identify the second plurality of objects.

9. The method of claim 8, wherein step (g) comprises:

illuminating with electromagnetic radiation at least one location tag;

sensing electromagnetic radiation emitted by the at least one location tag; and utilizing the electromagnetic radiation emitted by the at least one location tag to determine the second location.

10. The method of claim 8, wherein step (f) comprises recording an output of an inertial navigation unit aboard the mobile transceiver unit.

11. The method of claim 1, further including the step of transmitting the identification of the first location and the identity of the first plurality of objects to a computer.

12. The method of claim 11, further including the steps of:

receiving from the computer an identification of a second location; and advancing the mobile transceiver unit to the second location.

13. A computer-readable medium having computer-executable instructions for performing the steps of:

(a) determining a first location of a mobile transceiver unit;

(b) causing a radiation source to illuminate with electromagnetic radiation a first plurality of objects each having a tag attached to the object; and (c) utilizing the emitted electromagnetic radiation simultaneously emitted by the tags attached to the first plurality of objects to identify the first plurality of objects.

14. The computer-readable medium of claim 13, further including computer-executable instructions for performing the step of analyzing the sensed electromagnetic radiation to determine whether steps (b) and (c) should be repeated.

15. The computer-readable medium of claim 13, further including computer-executable instructions for performing the steps of:

moving an antenna attached to the mobile transceiver unit; and repeating steps (b) and (c).

16. The computer-readable medium of claim 13, wherein step (a) comprises recording an output of an inertial navigation unit aboard the mobile transceiver unit.

17. The computer-readable medium of claim 13, wherein step (a) comprises:

causing a radiation source to illuminate at least one location tag with electromagnetic radiation;

sensing electromagnetic radiation emitted by the at least one location tag;

utilizing the electromagnetic radiation emitted by the at least one location tag to determine the first location and a distance to the first location; and advancing the mobile transceiver unit to the first location.

18. The computer-readable medium of claim 13, further including computer-executable instructions for performing the steps of:

(d) moving the mobile transceiver unit to a second location;

(e) determining the second location;

(f) causing a radiation source to illuminate with electromagnetic radiation a second plurality of objects each having a tag attached to the object;

(g) simultaneously sensing electromagnetic radiation emitted by the tags attached to the second plurality of objects; and (h) utilizing the electromagnetic radiation emitted in step (h) to identify the second plurality of objects.

19. The computer-readable medium of claim 18, wherein step (e) comprises recording an output of an inertial navigation unit aboard the mobile transceiver unit.

20. An object location identification system, the system comprising:

a plurality of object tags attached to objects;

at least one location tag;

a mobile transceiver unit configured to perform the steps of:

(a) illuminating with electromagnetic radiation the plurality of object tags and the at least one location tag;

(b) simultaneously sensing electromagnetic radiation emitted by the object tags and the at least one location tag; and (c) utilizing the reflected electromagnetic radiation to identify the first plurality of objects.

21. A mobile electromagnetic transceiver unit comprising:

a means for transmitting electromagnetic radiation to location and object tags;

a means for decoding electromagnetic radiation emitted by the location and object tags;

a means for associating objects with locations; and a means for moving the transceiver unit.

22. A mobile electromagnetic transceiver unit comprising:

an antenna that transmits electromagnetic radiation to location and object tags;

a computer device programmed to decode electromagnetic radiation emitted by the location and object tags and associate objects with locations; and a motor configured to move the electromagnetic transceiver unit.

* * * * *